United States Patent [19]
Fee

[11] Patent Number: 5,995,256
[45] Date of Patent: Nov. 30, 1999

[54] METHOD AND SYSTEM FOR MANAGING OPTICAL SUBCARRIER RECEPTION

[75] Inventor: John A. Fee, Plano, Tex.

[73] Assignee: MCI Communications Corporation, Washington, D.C.

[21] Appl. No.: 08/941,546

[22] Filed: Sep. 30, 1997

[51] Int. Cl.[6] .................................................. H04J 14/02
[52] U.S. Cl. ........................ 359/125; 359/181; 359/124
[58] Field of Search ...................................... 359/125, 133, 359/124, 181, 118

[56] References Cited

U.S. PATENT DOCUMENTS 5,726,783   3/1998   Cooper et al. .......................... 359/125
5,739,934   4/1998   Nomura et al. ......................... 359/124

*Primary Examiner*—Kinfe-Michael Negash

[57] ABSTRACT

A method and apparatus are provided for high signal-to-noise ratio (SNR) optical subcarrier management and reception in a communication network. In a multiple-wavelength optical communications link, ancillary signals that are conveyed by low-level intensity-modulated subcarriers are received with increased sensitivity in the subcarrier channel of the network. An increased SNR is accomplished by passing the same ancillary signal along all the carriers and by combining the received signals at a summing amplifier in the electrical domain.

29 Claims, 7 Drawing Sheets

METHOD AND SYSTEM FOR MANAGING OPTICAL SUBCARRIER RECEPTION

CROSS-REFERENCE TO RELATED APPLICATIONS

This patent application is related to the following commonly owned, currently pending applications, the disclosure of each of which is incorporated herein by reference:

1. "Method and System for Detecting Link Failure in All Optical Communication Network," Ser. No. 08/582,845, by John A. Fee, filed on Dec. 29, 1995;
2. "All Optical Network with Low Level Subcarrier for Ancillary Data," Ser. No. 08/673,651, by John A. Fee, filed on Jun. 28, 1996;
3. "System and Method for Photonic Facility and Line Protection Switching," Ser. No. 08/577,663, by John A. Fee, filed on Dec. 22, 1995; and
4. "System and Method for Photonic Facility and Line Protection Using Wavelength Switching," Ser. No. 08/672,808, by John A. Fee, filed on Jun. 28, 1996.

BACKGROUND OF THE INVENTION

1. Field of the Invention

The present invention relates to optical communication network management and services. Specifically, this invention relates to simultaneously applying a low-level subcarrier modulation signal to multiple high-bit-rate modulated optical data signals propagating through the same fiber or similar path. A slow response-time summing amplifier is utilized at a reception point in the optical communication network to sum individual subcarrier components and thereby create a high signal-to-noise ratio of subcarrier modulation signals within the subcarrier channel of the communication network.

2. Related Art

A typical communication network, serving to transport information among a number of locations, consists of various physical sites, called nodes, interconnected by information conduits, called "links." Each link serves to carry information from one site to another site. Individual sites contain equipment for combining, separating, transforming, conditioning, and/or routing data.

Optical networks that include a plurality of optical transmission lines or links permit high bandwidth data communications, and may be used in telephone and other data network systems. High speed data can be modulated on light waves which are transmitted through the optical network. The optical transmission line, connecting an optical transmitter and receiver, can propagate many light wave signals of different frequencies simultaneously. One type of multi-frequency (or multi-wavelength) communication is found in wavelength-division-multiplexed (WDM) networks. See, e.g., U.S. Pat. No. 4,821,255, issued Apr. 11, 1989 to Kobrinski, incorporated herein by reference in its entirety. Thus, fiber optic communications links carry vast amounts of information among distant sites to accomplish data, voice and image connectivity over a large geographical area.

Optical networks carry high-data rate traffic supporting an ever-increasing variety and range of interconnected data networks, lower-level networks, distributed systems, consumer communication products and services, and remote units. As the proliferation and diversity of network elements and signals becomes greater, network management becomes even more critical.

Thus, a primary concern for network providers is accurately tracking the flow of data signals that traverse the communication network through various nodes, switching sites, and links. One method of tracking information without affecting the high data rate modulation signal is by providing ancillary network data as a rider on a high data rate modulated optical signal, as disclosed in the present inventor's related applications entitled "Method and System for Detecting LMink Failure in All Optical Communication Network," Ser. No. 08/582,845, and "All Optical Network with Low Level Subcarrier for Ancillary Data," Ser. No. 08/673,651. This subcarrier modulated signal can be used to monitor the status of the data signals, without having to alter the high data rate modulation signal itself.

For example, a low-level subcarrier signal can have a peak-to-peak intensity modulation that is a fraction of that of the high data rate modulated signal. A single period of the low-level subcarrier signal is then spread over thousands of high-rate bits and is readily separable by inexpensive optical detectors.

However, a problem can arise in detecting the subcarrier modulation signal as a result of a poor signal-to-noise ratio (SNR). Typical sources of noise within a communication network include: signal-spontaneous beat noise created from the subcarrier signal and the amplified stimulated emission (ASE) of optical amplifiers and regenerators; the spontaneous-spontaneous beat noise created by the ASE itself; shot noise created from the subcarrier signal and ASE; and thermal noise. For a discussion on the types of noise found in optical communication systems, see Murakami, et al., "A Remote Supervisory System Based on Subcarrier Overmodulation for Submarine Optical Amplifier Systems," *Jour. of Lightwave Tech.*, Vol. 14, No. 5, 671–677 (May 1996), which is incorporated by reference in its entirety herein. Because the subcarrier modulation signal must have a low amplitude as compared to the high data rate modulation signal (i.e., low enough to not interfere with reliable reception of the high-bit-rate signal), detection of the subcarrier signal is especially vulnerable to noise problems leading to a low SNR.

SUMMARY OF THE INVENTION

The present invention provides a method and apparatus for high signal-to-noise ratio (SNR) optical subcarrier management and reception in a communication network. According to a first embodiment of the present invention, a subcarrier modulation signal carrying ancillary network data is generated by a subcarrier modulation signal generator at the first site. This subcarrier modulation signal has a lower frequency and lower amplitude than high data rate modulation signals transported by the network. The subcarrier modulation signal generator is part of a subcarrier channel of the communication network. The subcarrier channel is supported by network equipment that generates, propagates and receives subcarrier modulation signals. In addition, this subcarrier channel can be accessed by a network management system to monitor the status of data traveling throughout the network.

The subcarrier modulation signal generated at a first site is superimposed upon both a first high data rate modulation signal and onto a second high data rate modulation signal. These high data rate modulation signals are then separately converted into optical carrier signals of different corresponding wavelengths by optical sources located in the transmitter of the first site. Next, the separate optical signals of different wavelengths are passed through a wavelength division multiplexer which converges the signals such that they may propagate together in the same direction through a single optical fiber. This wavelength division multiplexed (WDM) modulated optical data signal is transmitted from the first site along a fiber link to the second site. Along this fiber link, each of the optical carriers bears a common subcarrier modulation in addition to their respective high data rate signals.

The WDM modulated optical data signal is then de-multiplexed at the second site into its separate wavelength components, each of which still contains the subcarrier modulation signal rider superimposed onto the separate optical carrier signals at the first site. These wavelength components are separately detected by a set of photodetectors. The photodetectors generate electrical signals that correspond to each wavelength component and the subcarrier modulation signal.

The subcarrier components of each of the electrical signals generated by the photodetectors are received and combined in a summing amplifier located at the second site and in the subcarrier channel of the communication network. The high data rate outputs of the photodetectors are directed to further network equipment, such as signal demodulators or digital switching sites. Because the same subcarrier modulation signal was applied to the separate optical carriers at the first site, each recovered subcarrier component that emerges from the separate photodetectors corresponds to the subcarrier modulation signal generated at the first site. The summing amplifier strengthens the subcarrier modulation signal retrieved by the photodetectors and subtracts out the low frequency noise picked up by the WDM modulated optical data signal that can occur, for example, during transport along the fiber link.

The resulting signal generated by the summing amplifier is called a composite subcarrier modulation signal, which has a higher signal-to-noise ratio (SNR) than the individual subcarrier components obtained from each photodetector at the reception point of the second site. The composite subcarrier modulation signal can be sent to a subcarrier receiver, also located in the subcarrier channel of the network. A network management system can monitor the subcarrier modulation signal to determine if, for example, sites in the network are communicating properly. In addition, the subcarrier receiver can send the composite subcarrier modulation signal to a subcarrier modulation signal generator located in the subcarrier channel of the second site, where the composite subcarrier modulation signal can be applied to a transmitter site also located at the second site, to provide further network communication.

According to a second embodiment of the present invention, a second summing amplifier can be placed in the subcarrier channel at the second site. The second summing amplifier is connected to the outputs of photodetectors at the second site to allow further subcarrier modulation signal assignments to other network equipment in the subcarrier channel.

The present invention provides for the tracking of data signals in a communication network by employing a method of managing low-level intensity-modulated subcarrier signals containing ancillary network data. This ancillary network management information can be communicated regardless of the quality or loss of the high data rate modulation signal.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
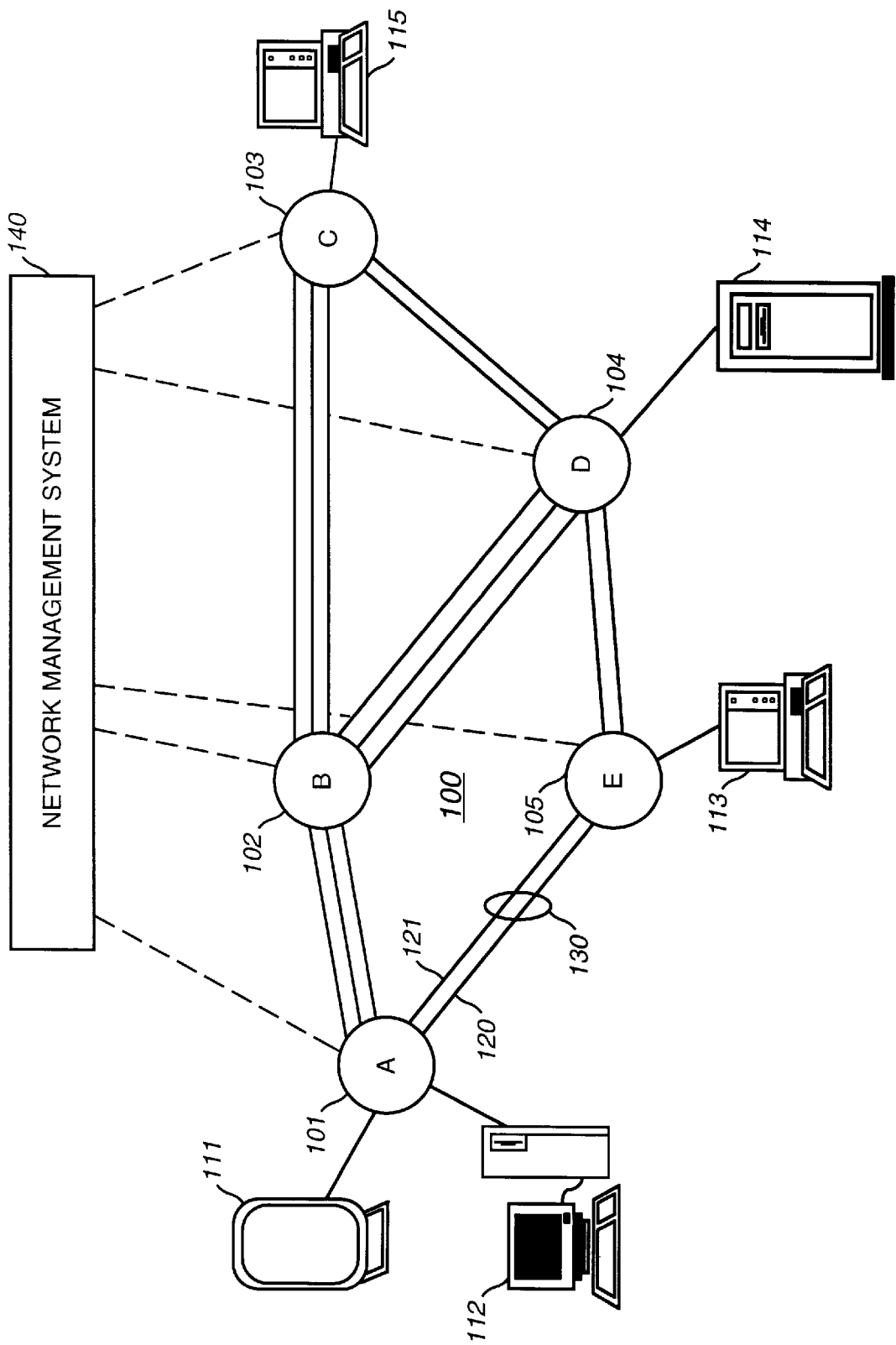
FIG. 1 is a block diagram of an example communications network.

1. Overview and Discussion of the Invention

The present invention provides for the tracking of data signals in a communication network using low-level intensity-modulated subcarrier signals containing ancillary network data. This ancillary network management information can be communicated regardless of the quality or loss of the high data rate modulation signal. The manner in which this is accomplished is described in detail below.

2. Terminology

According to the present invention, a subcarrier modulation signal can be generated, carried, and received in a "subcarrier channel." The subcarrier channel is carried by all network equipment that generates, propagates, receives, and processes subcarrier modulation signals. In one preferred example, a subcarrier modulation signal is a low frequency modulation signal, including but not limited to the range of approximately 10 KHz to 10 MHz. The subcarrier modulation signal includes ancillary network data that provides network management with the ability to monitor the status of a data signal traveling through the network. The present invention is not so limited, however, as any type of data can be carried in the subcarrier modulation signal.

Further, the term "multi-wavelength modulated optical data signal" refers to the optical data signal that is transported between WDM sites in an optical network. According to the present invention, in a WDM environment, the multi-wavelength modulated optical data signal includes several individual "optical carrier" signals that have been multiplexed at a transmission site. Each "optical carrier" signal has a corresponding wavelength and can be generated by Line Terminating Equipment (LTEs) that include optical sources, such as laser diodes.

According to the present invention, each optical carrier signal includes a "high-bit-rate" (or "high data rate") modulation signal that is the optical counterpart to a high data rate electrical signal, such as a SONET compliant STS-N signal, modulated at high frequency (e.g, 1 to 40 GHz). The high data rate component of the optical carrier signal is also referred to as a "high data rate modulated optical data signal." According to the present invention, each optical carrier also includes the optical counterpart to the subcarrier modulation signal described above.

Thus, one advantage of the present invention is that ancillary network data can be communicated regardless of the quality or loss of the high data rate modulation signal as long as the optical carrier persists. The manner in which this is accomplished is described in detail below.

3. Example Environment

The present invention can be implemented in any optical communication network that utilizes subcarrier modulation signals to transport ancillary network data.

The present invention is described in terms of an example optical communication network management environment for convenience only. It is not intended that the invention be limited to application in this example environment. In fact, after reading the following description, it will become apparent to a person skilled in the relevant art how to implement the invention in alternative environments.

FIG. 1 shows an example typical communications network 100 comprising sites 101–105 connected by links. Links are generally implemented using electrical cables, satellites, radio or microwave signals, or optical connections and can stretch for tens or hundreds of miles between sites. Through these links, the communications system 100 carries data signals among the sites 101–105 to effectively interconnect data remote equipment 111–115, i.e., computers, remote terminals, servers, etc. One or more links 120 and 121 that connect two sites are collectively referred to as a span 130. These sites 101–105 normally contain at least one cross-connect switch (either electrical or optical) and are in constant communication with a central network management system facility 140 which monitors and/or controls the flow of traffic throughout the network.

Figure 2:
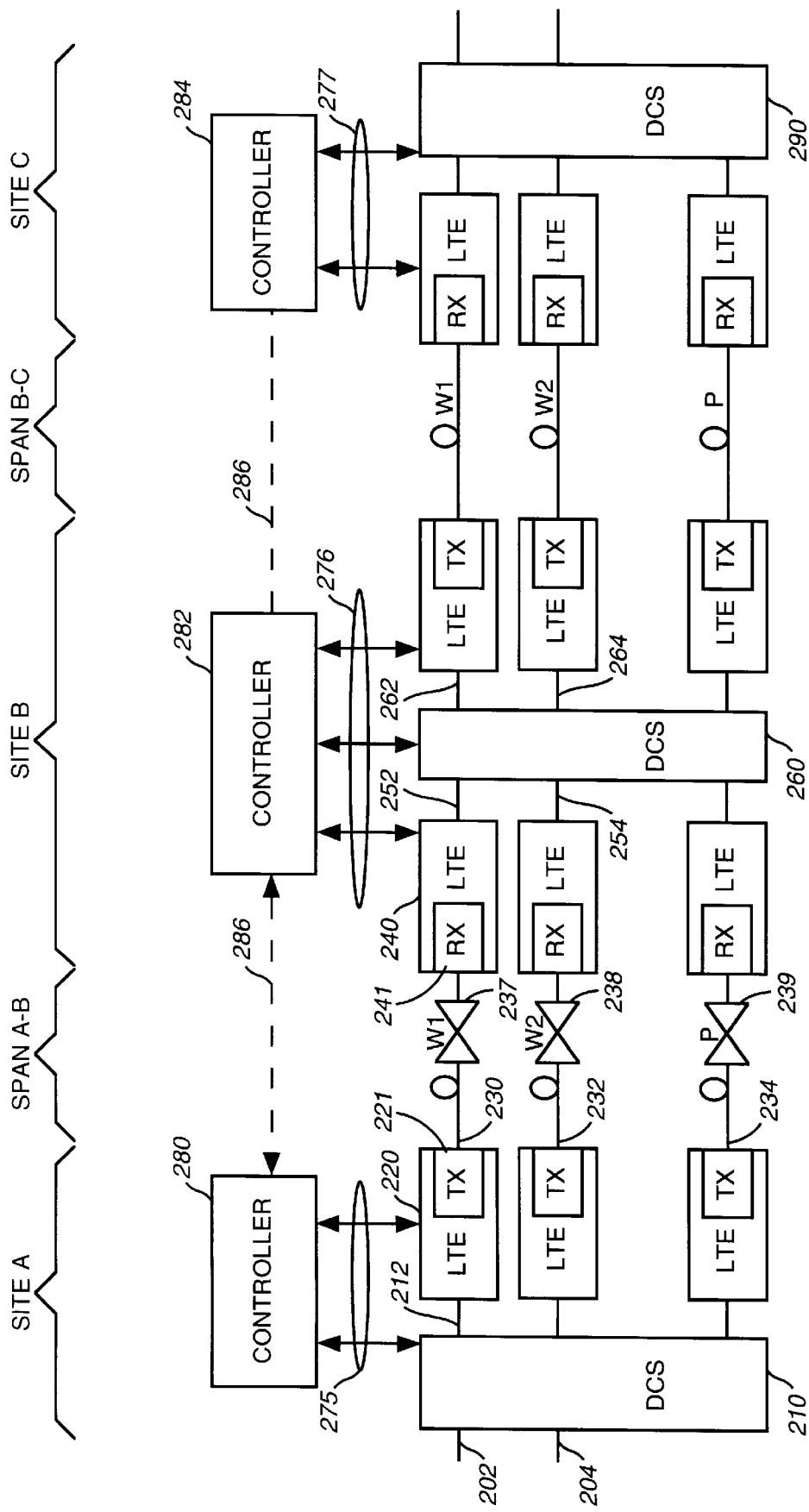
FIG. 2 is a block diagram of the electrical and optical components employed in an optical data communications span.
Figure 3:
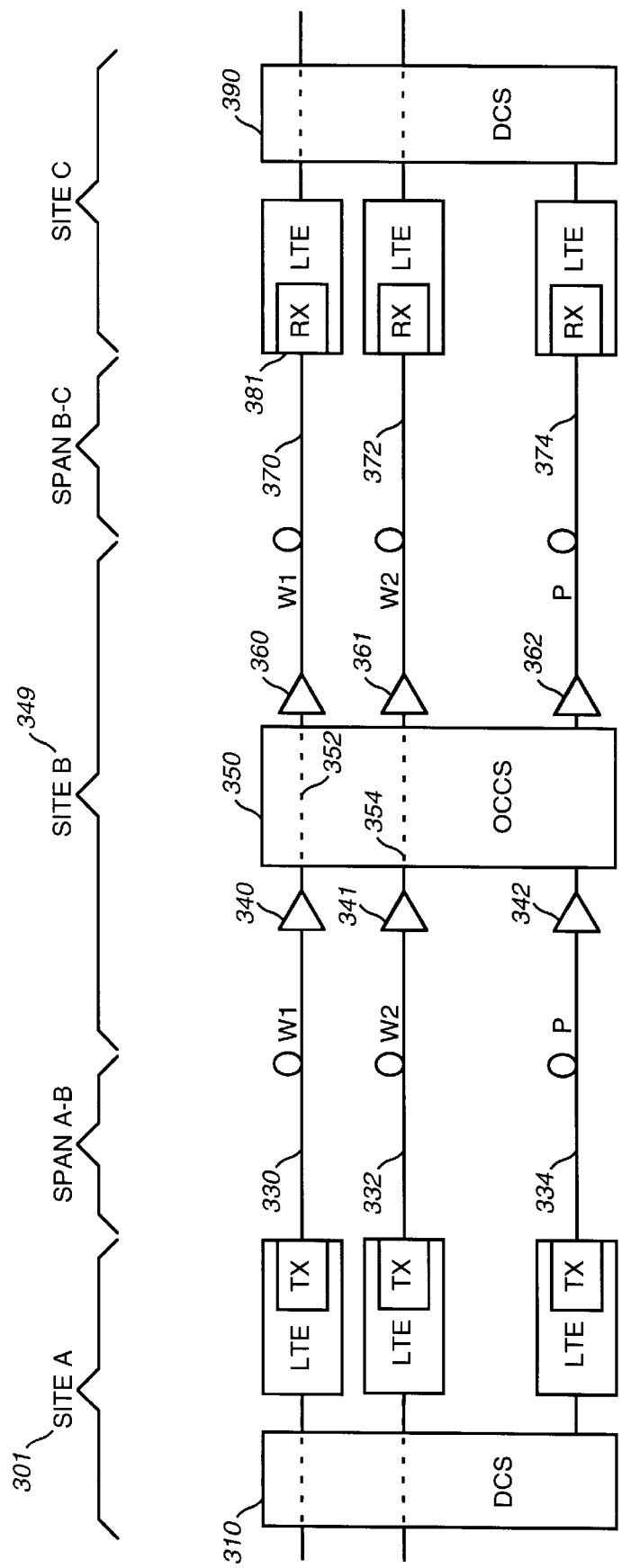
FIG. 3 illustrates a portion of an optical network showing the role of an intermediate optical cross-connect switch.

Example implementations of high data rate optical spans are depicted in FIGS. 2 and 3. In FIG. 2, a given site A is connected to another site B by a span comprising three optical fibers 230, 232, and 234. Two electrical data signals are presented at Site A via inputs 202 and 204. These signals are carried through the network span and recovered at Site B as electrical signal outputs 262 and 264, respectively. For example, these data signals can be STS-48 synchronous data signals each bearing digital data at about 2.5 Gbps or the equivalent of 32 thousand telephone-quality voice channels.

At Site A, a signal enters a digital cross-connect switch (DCS) 210, and under normal conditions appears as an electrical signal. The signal enters optical Lightwave or Line Terminal Equipment (LTE) 220 shown to include an optical transmitter 221, such as a semiconductor laser. Light emitted by the transmitter 221 is intensity-modulated by the electrical data signal that enters along connection 212 to deliver a modulated optical output signal over optical fiber 230.

LTE 220 further includes wavelength division multiplexing (WDM) equipment, such as a wavelength division multiplexer, which allows for further bandwidth improvement by modulating different electrical data signals on distinct light wave carriers having different frequencies. Optical systems using WDM require optical transmitters and receivers that operate at different light wave frequencies. The optical transmission line, such as optical fiber 230, connecting an optical transmitter and receiver, can propagate many light wave signals of different frequencies simultaneously.

While traversing optical fiber 230, an optical signal can encounter a series of signal amplifying equipment, such as an optical amplifier (not shown) and/or an optical regenerator 237. Signal amplifying equipment are necessary to maintain signal strength over long fiber distances. Multiple optical amplifiers and/or regenerators can be spaced along a fiber link to increase range.

After traversing the length of fiber 230, the optical signal arrives at Site B and enters a receiver 241, such as a photodiode. The receiver 241 is shown to be a part of an LTE 240 that amplifies and conditions the signal to render a faithful electrical reproduction at output port 252 of the original electrical data signal provided at input 202. In a similar manner, an electrical data signal presented at input 204 is transported by LTE 222, fiber 232, and LTE 242 to output port 254. When the network uses WDM, LTE 240 contains WDM equipment that demultiplexes the multiple wavelength high data rate optical signal that travels over optical fiber 230.

Under normal circumstances, digital cross-connect switch DCS 260 connects port 252 to output port 262 to complete the end-to-end connection of input 202 to output 262. Likewise, DCS 260 normally connects line 254 to output 264 to complete the end-to-end connection of input 204 to output 264.

Span B-C connects site B to site C. Electrical DCS switches 210, 290 are provided at respective endpoint sites A, C. Traffic between sites A and C travels through an intermediate optical/electronic site B. Spans A-B and B-C interconnect the sites as shown. Thus, FIG. 2 illustrates the practice of performing optical-electrical-optical conversion at each site.

Typically, controllers 280, 282, 284, coordinated with each other over a separate communications link 286, direct the switching action of DCSs 210, 260, 290 via control connections 275, 276, 277. Each controller is typically an imbedded microprocessor, computer, workstation, or other type of processor for controlling the switching of lightwave terminal equipment, digital cross-connect switches, and optical cross-connect switches.

For example, status messages can be sent to indicate, acknowledge, or confirm a link or node state such as an idle, active, inactive, or detected fault state. Any digital signaling protocol can be used including, but not limited to, X.25, Frame Relay, ATM, B-ISDN or Common Channel Signaling 7 protocols. Alternatively, controllers can communicate status messages using overhead bits or bytes within the data protocol that traverses the optical fibers. Restoration algorithms and protocols applied within the controllers to restore end-to-end connectivity in response to a fault detection are well known to those skilled in the art.

FIG. 3 shows an example link where data signal switching is performed in the optical domain. Compared to optical-electronic switching as described with respect to FIG. 2, spans A-B and B-C are optically interconnected at site B. FIG. 3 shows that an entire set of LTEs and a DCS at site B have been replaced by an optical cross-connect switch (OCCS) 350 and several optical amplifiers 340–342 and 360–362. Optical switch 350 is controlled by a controller or network management system in the same way as digital cross-connects 210, 260, 290. An electrical control signal (or an optical control signal) drives the optical switch to selectively form optical connections among various input and output ports facing working and protect optical fibers 330–334, 370–374. For example, internal connections 352 and 354 within OCCS 350 optically couple respective working fibers 330, 332, 370, 372 in both spans A-B, B-C under normal network conditions as shown in FIG.3. The optical amplifiers 340–342, 360–362 intensify the lightwave signal and compensate for losses introduced by working fibers 330, 332, 370, 372 and OCCS 350.

Optical switching introduces additional difficulties in network management. For example, conventional fault detection and isolation cannot be performed because signal integrity checks inherent in the electrical domain, such as cyclic redundancy check (CRC) and framing, are not performed in the optical domain. One method of introducing a checking or monitoring mechanism is to add a low level subcarrier to the optical carrier at a transmission site (e.g. site A in FIG. 3) and detect it at an optical switching node (e.g., site B, in FIG. 3). To better utilize the subcarrier modulation signal, especially in the event of a fiber outage, ancillary data is tagged onto the subcarrier modulation signal. The ancillary data can include network management information. For example, a subcarrier modulation signal can contain important network status information (e.g., information about the integrity or performance of a data signal). The subcarrier modulation signal is modulated at or about 1 to 10 MHz and can be linearly added to an incident high data rate modulation signal, such as a SONET signal modulated at approximately 10 GHz.

By demodulating the subcarrier modulation signal, the ancillary network data can be recovered at any point along an optical network link. The recovered ancillary network data is useful for a myriad of network applications including tracing network timing references, cumulative link identification, wavelength remapping and re-use, telemetry and transmission performance evaluation, customer data payload identification, operational status indication, and/or other network management operations.

Figure 4:
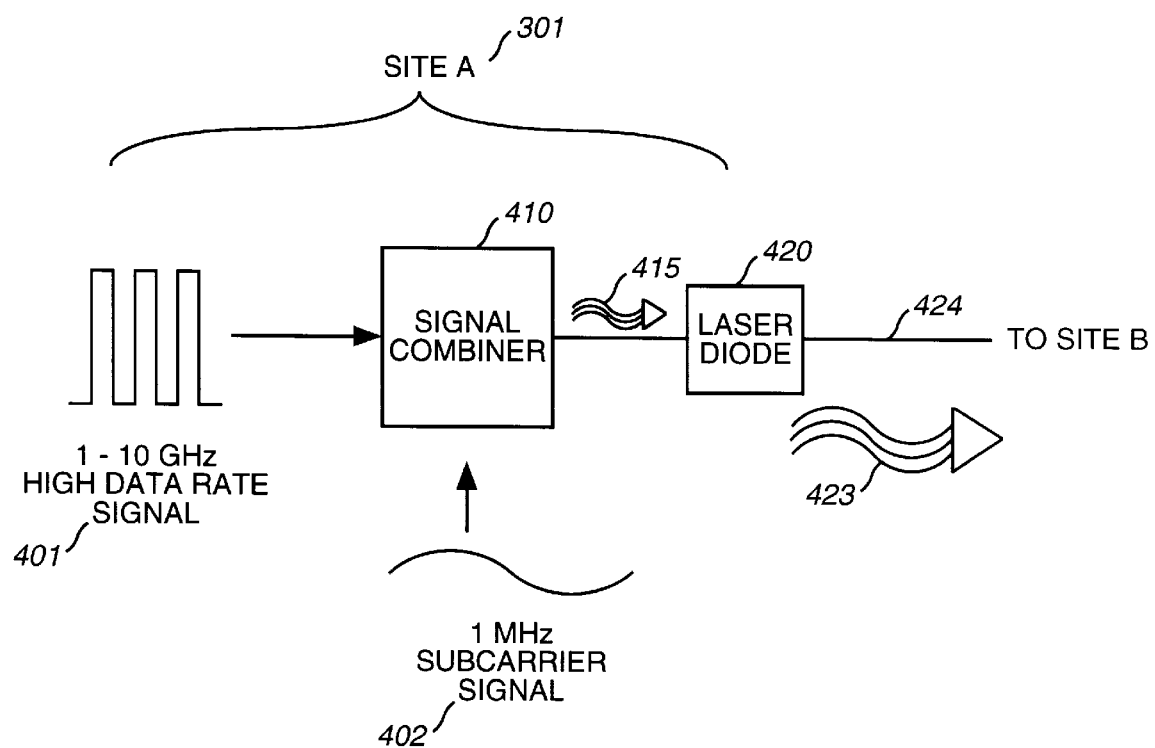
FIG. 4 illustrates one approach to generating a modulated optical data signal containing high data rate modulation signal and subcarrier modulation signal components.

4. Subcarrier Modulation Signal Management a. Subcarrier Modulation Signal Generation FIG. 4 displays one approach to generating a modulated optical data signal containing high data rate modulation signal and subcarrier modulation signal components. See, "All Optical Network with Low Level Subcarrier for Ancillary Data," Ser. No. 08/673,651. At site A 301, a high data rate modulation signal 401 (e.g a 1–10 GHz data signal) is presented at an input to a signal combiner 410. In addition, a monitoring subcarrier modulation signal 402 is incident at a second input to combiner 410. Composite signal 415, representing the linear summation of signals 401 and 402, appears at the output of combiner 410. Composite signal 415 is used to intensity modulate laser diode 420 to produce an intensity modulated optical data signal 423 (also called an optical carrier signal), e.g., an Optical Carrier OC-192 signal. Alternative means of externally modulating the gain of a signal transmitter or using coherent techniques known in the art may also be used to create an intensity modulated optical carrier signal that is modulated with a high data rate modulation signal and a superimposed low-level, subcarrier modulation signal 402.

In general, any type of high data rate modulated optical source can be used, such as an integrated-type of direct modulated laser or an externally modulated laser, depending upon the required performance, cost, and other known design considerations.

The subcarrier modulation signal 402 has a lower frequency and/or amplitude than the high data rate modulation signal 401. In a preferred embodiment, the frequency of the superimposed subcarrier modulation signal 402 is several orders of magnitude less than that of the high data rate modulation signal 401. For example, if high data rate modulation signal 401 is on the order of 1 to 10 GHz, i.e. a SONET-compliant STS-48 digital signal (approx. 2.5 GHz) or an STS-192 signal (approx. 9.9 GHz), a subcarrier modulation signal 402 can range from 1 KHz to 10 MHz, depending on the response bandwidth of detection equipment used at a point of signal reception. Further, the subcarrier modulation signal 402 has a fraction, i.e. one-tenth, of the amplitude of the high data rate modulation signal 401. These example frequencies and amplitudes are illustrative only, and not intended to limit the present invention. Other ranges of amplitudes and frequencies for the subcarrier modulation signal 402 and the high data rate modulation signal 401 can be selected. The modulated optical signal is eventually transported over fiber link 424 to site B (such as shown in either FIGS. 2 or 3).

b. Subcarrier Modulation Signal Generation in a WDM Network

According to a further feature of the present invention, a high signal quality subcarrier channel is managed in a WDM network.

Figure 5:
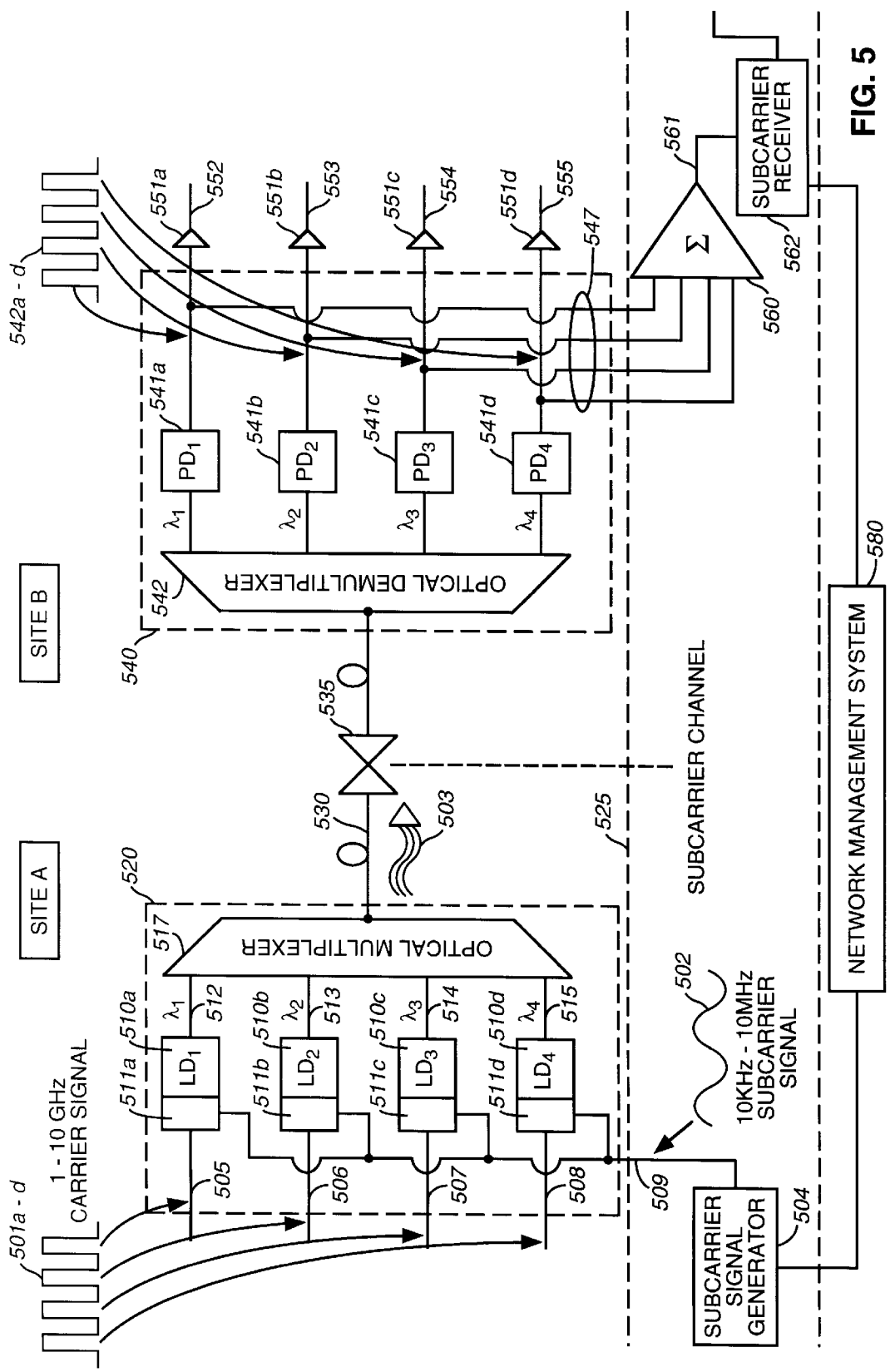
FIG. 5 is a block diagram of an optical communication network utilizing a subcarrier channel according to the present invention.

FIG. 5 displays the present invention in an example WDM network implementation. A high data rate modulation signal 501*a* is presented at site A at an input 505 to a WDM LTE 520, which includes a series of optical transmitters 510*a*–510*d*. Other high data rate modulation signals 501*b*–501*d* are presented at further respective inputs 506–508 to LTE 520. High data rate modulation signals 501*a*–501*d* can originate from path terminating equipment located at various local user sites or enter LTE 520 directly from an adjacent digital cross-connect switch (not shown). It should also be noted that LTE 520 may also comprise signal receiving equipment. For simplicity, only transmitting equipment is shown at LTE 520 in FIG. 5.

For example, in this embodiment of the present invention, each high data rate modulation signal 501*a*–501*d* comprises a 1–10 GHz data signal, such as a SONET rate STS-N electrical signal. These high data rate modulation signals 501*a*–501*d* are used to modulate laser diodes 510*a*–510*d*, which convert the electrical data signals into corresponding optical carrier signals, referred to as SONET OC-N type signals. Additionally, in a preferred embodiment, optical transmitters 510*a*–510*d* are directly modulated semiconductor laser diodes, which can either operate at a fixed wavelength or operate as tunable devices. Other types of optical transmitters and modulators can be used. In this embodiment of the present invention, the high data rate modulation signals 501*a*–501*d* are used to modulate drivers 511*a*–511*d*, which drive laser diodes 510*a*–501*d*, respectively, to create modulated optical data signals.

In order to permit wavelength agility in an optical communications network, a tunable optical transmitter can be used to transmit modulated optical data signals. This tunable source can be either a tunable laser (such as a semiconductor diode laser) or a fixed source coupled to a frequency translator. See, commonly owned applications Ser. Nos. 08/577,663 and 08/672,808, incorporated herein by reference above.

An electrical subcarrier modulation signal 502 containing ancillary network information is generated by subcarrier modulation signal generator 504. As mentioned above, subcarrier modulation signal 502 can be used in a communication network to convey network information to and from the network management system 580 at various nodes throughout the communication network. Subcarrier modulation signal 502 has a lower amplitude than the high data rate modulation signal (approximately one-tenth of the high data rate modulation signal amplitude). Also, subcarrier modulation signal 502 has a lower frequency (10 KHz–10 MHz) than the high data rate modulation signal (1–10 GHz).

According to the present invention, the same subcarrier modulation signal 502 is applied to the multiple high data rate modulation signals which will propagate along a common optical path. In one example embodiment shown in FIG. 5, subcarrier signal generator 504 simultaneously presents subcarrier modulation signal 502 at each laser diode driver 511a–511d via electrical conduit 509. Subcarrier modulation signal 502 and high data rate modulation signal 501a form the bias current driving laser diode 510a and are thus superimposed onto the modulated optical data signal that is emitted along fiber 512. Alternatively, a method utilizing a signal combiner, as discussed above, can be used to create modulated optical data signals, which contain high data rate modulation signal 501a–501d and subcarrier modulation signal 502 components.

In WDM communication, each laser diode 510a–510d at LTE 520 operates at a different optical wavelength. For example, laser diode 510a generates an optical carrier signal with an operating wavelength $\lambda_1$. Laser diodes 510b–510d generate optical carrier signals of wavelengths $\lambda_2$–$\lambda_4$, respectively. These multiple wavelength optical signals propagate along respective fibers 512–515 and enter optical multiplexer 517. Optical multiplexer 517 forms a single, multiplexed, modulated optical data signal 503. Multiplexed, modulated optical data signal 503 propagates along outbound fiber link 530 to some other node located in the communication network. Multiplexer 517 may be a star coupler, grating-type multiplexer, or other wavelength combining device that is well known in the art. Modulated optical data signal 503 has four wavelength components ($\lambda_1$–$\lambda_4$) in this example. In general, any number of separate wavelength signals can be contained in modulated optical data signal 503, depending on the type of WDM equipment utilized at LTE 520.

c. Subcarrier Modulation Signal Reception

After traveling a given distance over optical fiber 530, the WDM modulated optical data signal 503 encounters a signal reception point. The signal reception point can be, for example, a LTE receiver, such as LTE 540, or, in the case of a long distance fiber link, some type of section terminating equipment (STE), such as optical regenerator 535, which is utilized to maintain signal strength. According to the present invention, at any point of reception, the modulated optical data signal can be de-multiplexed in order to separate out the various wavelength components of the carrier signal, and the ancillary network information can be simultaneously received with an improved SNR within subcarrier channel 525. According to the present invention, subcarrier channel 525 is supported by subcarrier modulation signal generating and receiving equipment located in the communication network.

Figure 6A:
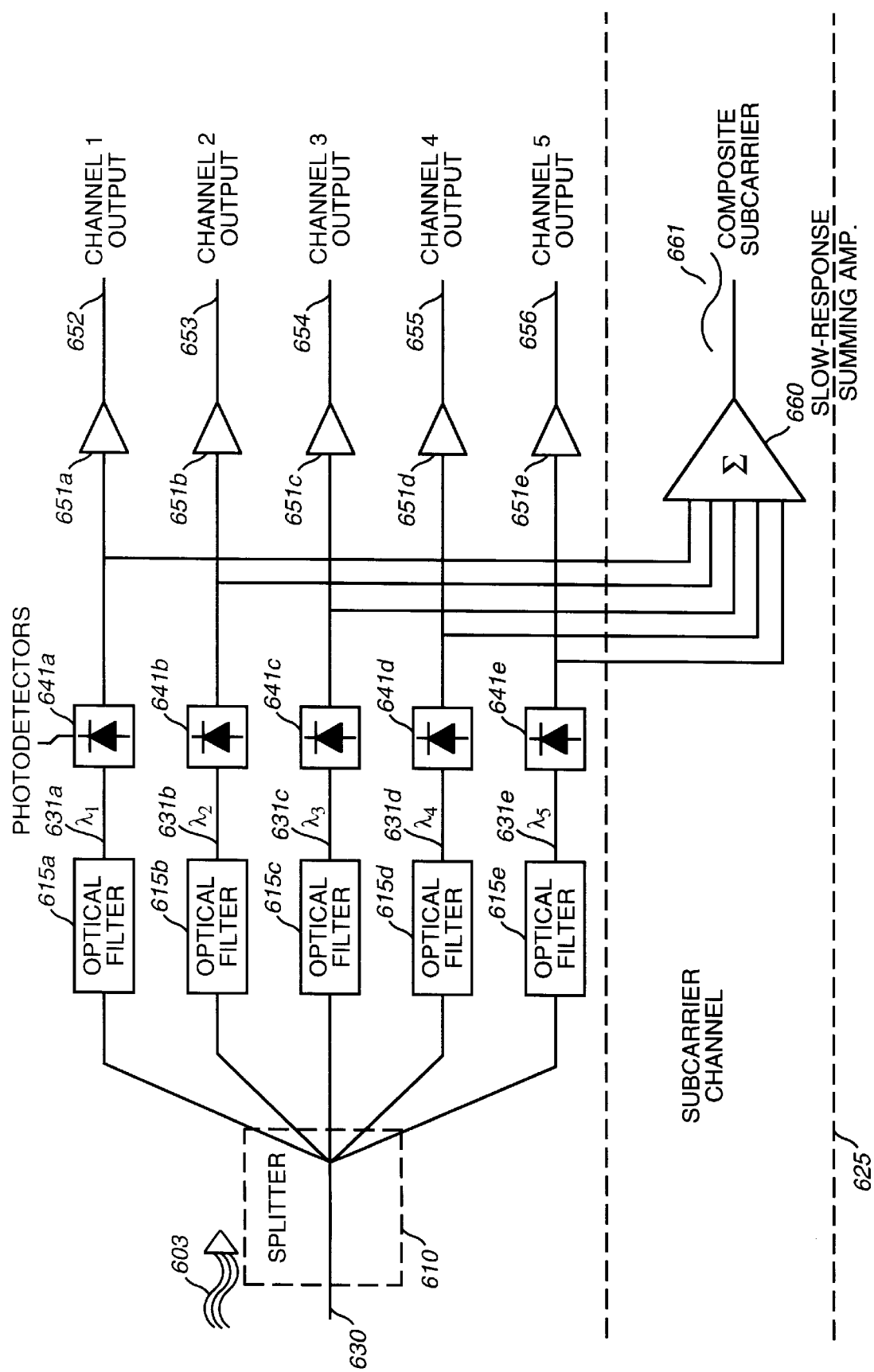
FIG. 6A is a block diagram of a point of reception according to one embodiment of the present invention.

For example, FIG. 5 displays a signal reception point at site B, wherein LTE 540 can demultiplex the multiple wavelength components of modulated optical data signal 503 through the use of optical signal de-multiplexer 542. Optical signal de-multiplexer 542 can include a single block WDM grating device, as shown here in FIG. 5, or an optical signal splitter and a series of optical filters, as shown in FIG. 6A (described further below).

A series of photodetectors 541a–541d, respectively detect the separate wavelength components of the de-multiplexed optical signal and generate electrical signals 542a–542d representative of the respective optical signals. According to the present invention, a composite subcarrier modulation signal with an improved SNR is recovered in subcarrier channel 525 by summing amplifier 560. Summing amplifier 560 sums the subcarrier modulation signals contained in each separate electrical representative. Portions of the electrical signals 542a–542d are tapped off by electrical conduits 547 into a summing amplifier 560. Preferably, the input impedance of summing amplifier 550 is chosen to be high enough to prevent the loss of signal strength of electrical signals 542a–542d, which continue on to channel outputs 552–555. One advantage of the present invention is that summing amplifier 560 can be any known, slow-response time, multi-channel electrical signal amplifier. See, *The Art of Electronics*, by P. Horowitz and W. Hill, Cambridge University Press, p. 185 (1994), incorporated herein by reference. Summing amplifier 560 functions similar to an Amplitude Modulation (AM) detector. the high frequency component of the electrical representative signals 542a–542d (i.e., the SONET rate data signals corresponding to high data rate modulation signals 501a–501d) are of such a high frequency as to be outside of the response band of summing amplifier 560.

Thus, according to the present invention, at a point of reception for the subcarrier modulation signal, the electrical outputs of all the optical detectors are summed to take advantage of the multiple reception channels. By summing the electrical outputs, the subcarrier components will add, whereas the noise will tend to cancel, yielding an improved SNR within the subcarrier channel 525. This effect can also be employed to allow for lower modulation levels of the subcarrier modulation signals while preserving the same SNR. Moreover, the present invention can be used to assure robust transmission of subcarrier data along a WDM path even if some of the optical carriers fail.

Electrical signals 542a–542d, e.g., STS-N electrical signals, are available at channel outputs 552–555. These signals 542a–542d travel to network equipment capable of demultiplexing the high data rate SONET rate signal to its constituent DS-3 signal. Alternatively, this point of reception can be located at a node that will regroom the content of the optical signals and switch them onto different outgoing links. For example, channel outputs 552 and 553 can be switched to north-bound links and channel outputs 554 and 555 can be switched to east-bound links. Thereafter, these high data rate modulation signals 542a–542d travel to other outbound LTEs for remodulation before they are sent out in their intended directions.

The output of summing amplifier 560 is referred to as a composite subcarrier modulation signal 561 which travels to a subcarrier receiver 562. Subcarrier generator, summing amplifier 560, and subcarrier receiver 562 support subcarrier channel 525. Subcarrier receiver 562, in turn, can send composite subcarrier modulation signal 561 to another subcarrier modulation signal generator (not shown) located in subcarrier channel 525. Further, subcarrier receiver 562 provides an access point for network management system 580 to monitor the status of subcarrier channel 525. Thus, subcarrier channel 525 provides the communication network with an adjunct, indication channel that contains, for example, line code information, modulation scheme information, and/or signal rate information. As explained above, the type of network information available on subcarrier channel 525 is highly useful for a communication network. For example, composite subcarrier modulation signal 561 can provide network management with fault detection information, such as a fiber break, equipment failure, or signal status information.

It should also be noted that the point of reception can also occur at an optical regenerator, such as optical regenerator 535.

In addition, the present invention is compatible with a communication network using optical cross-connect switches (OCCSs), such as OCCS 350 shown in FIG. 3. When performing a switching function, OCCS 350 leaves all wavelengths of a WDM modulated optical data signal intact (i.e., it does not convert the WDM modulated optical data signal back into the electrical domain). Therefore, the subcarrier modulation signal component of the WDM modulated optical data signal, such as subcarrier modulation signal 502, need not be regenerated at an optical switching site.

As mentioned above, the point of reception for a modulated optical data signal can comprise an optical signal splitter and a series of optical filters, which act to de-multiplex the modulated optical data signal. FIG. 6A schematically illustrates this alternate embodiment of the present invention. A modulated optical data signal 603 is generated and propagated along a fiber link 630 by WDM equipment in a similar manner as described above in connection with FIG. 5. Modulated optical data signal 603 comprises both high data rate and subcarrier modulation signal components, such as signals 501a–501d and signal 502 from FIG. 5. In this example, optical signal splitter 610 separates the incoming modulated optical data signal into five separate signals, corresponding to the number of multiple wavelength carriers, which in this example consists of five different wavelength carriers ($\lambda_1$–$\lambda_5$). Optical signal splitter 610 can be any type of known optical splitter.

Optical filters 615a–615e operate as band-pass filters and pass respective wavelength components of the split optical signal along optical fibers 631a–631e to a series of photodetectors 641a–641e. For example, optical filter 615a passes only the $\lambda_1$ component of the WDM modulated optical data signal onto photodetector 641a, whereas optical filter 615b passes only the $\lambda_2$ component of the WDM modulated optical data signal onto photodetector 641b, etc. Photodetectors 641a–641e generate electrical signals corresponding to the separate wavelength components of the WDM modulated optical data signal in a similar manner as described above in connection with FIG. 5.

The subcarrier components of the electrical signals emerging from photodetectors 641a–641e are tapped-off into the slow-response summing amplifier 660 of the subcarrier channel 625. As mentioned above, a high impedance amplifier can be used for amplifier 660 in order to avoid reducing the signal strength of the electrical signals. The electrical signals are amplified by a series of electrical signal amplifiers 651a–651e and are sent to channel outputs 652–656, respectively.

Figure 6B:
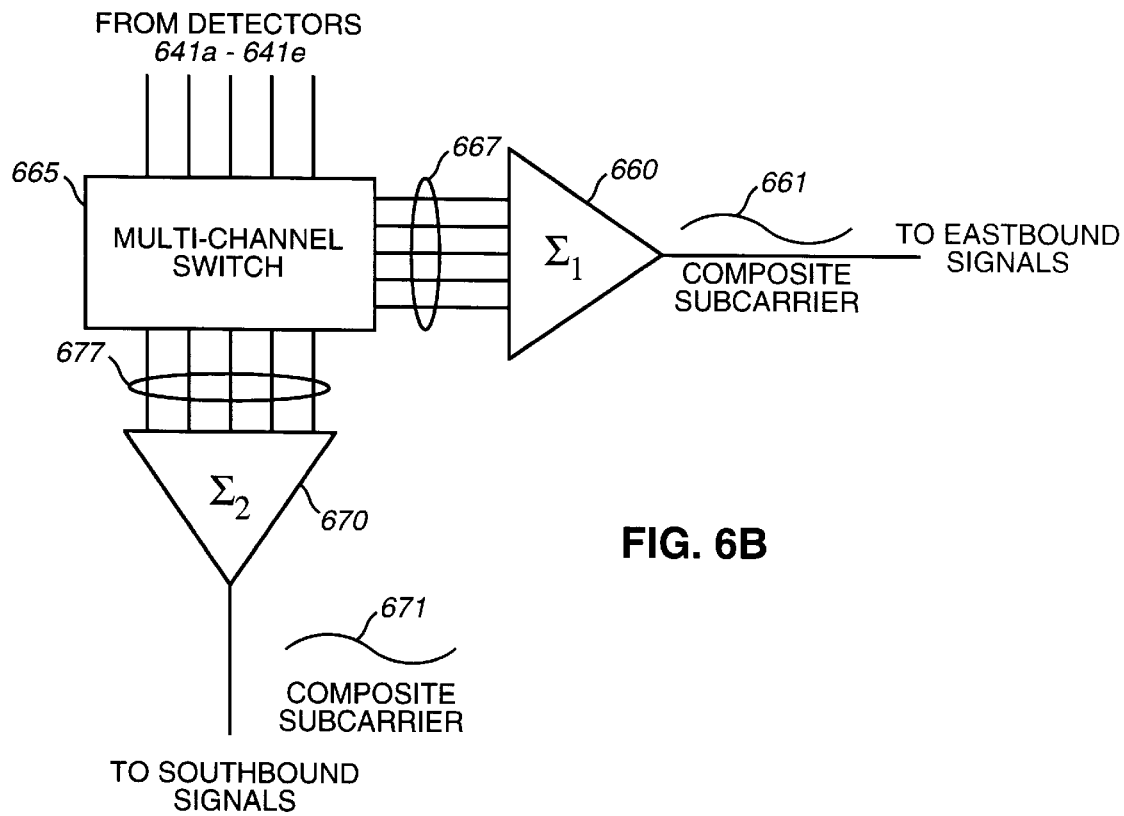
FIG. 6B is a block diagram of a point of reception with multiple summing amplifiers according to a further embodiment of the present invention.

In addition to having a single summing amplifier at a point of reception, a further embodiment of the present invention provides for additional summing amplifiers to be utilized in the subcarrier channel. FIG. 6B schematically illustrates this alternate embodiment of the present invention. For example, the low frequency components of the electrical signals generated by photodetectors 641a–641e can be directed into a multi-channel switch 665. Switch 665 can be activated by network management (such as network management system 580 in FIG. 5) to switch a portion or all of the electrical signals along electrical conduits 667 towards summing amplifier 660. Additionally, the remaining signals can be directed along electrical conduits 677 towards a second summing amplifier 670 also located at this point of reception.

Summing amplifiers 660 and 670 generate composite subcarrier signals 661 and 671, respectively. Composite subcarrier signals 661 and 671 can be used for a variety of network applications, as explained above. For example, when this point of reception according to the present invention is located at a switching node, composite subcarrier signal 661 can be used as a rider on modulated optical data signals traveling in the eastbound direction. Similarly, composite subcarrier signal 671 can be used as a rider on modulated optical data signals traveling in the southbound direction.

Even when only two of the electrical signals are directed towards either summing amplifier 660 or summing amplifier 670, the composite subcarrier signals 661 and 671, respectively, have an increased SNR, as explained above. Thus, the present invention provides a switching arrangement that facilitates recovery from network failures by regrouping the photodetector signals into additional summing amplifiers. In addition, this embodiment of the present invention allows flexible subcarrier modulation signal assignments.

Figure 6C:
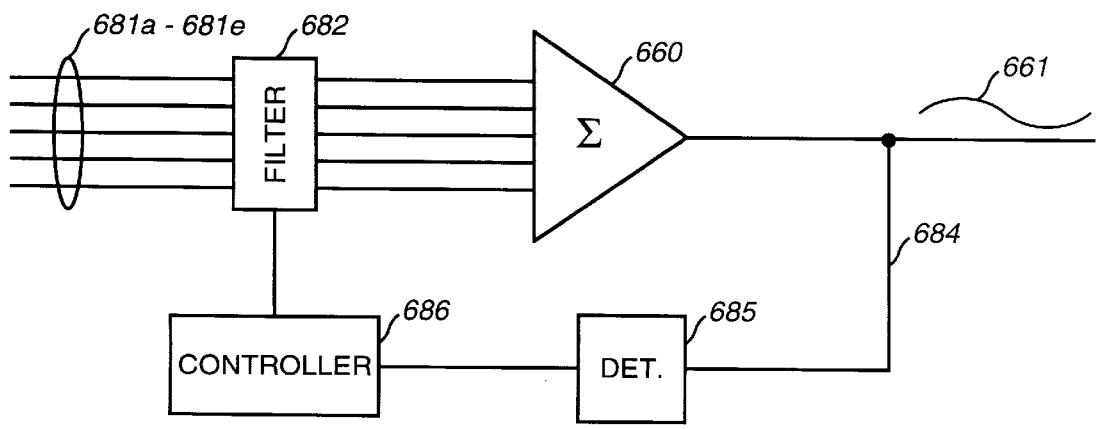
FIG. 6C is a block diagram of a point of reception with a feedback controlled variable filter according to a further embodiment of the present invention.

In addition, the present invention can further improve the SNR of the subcarrier channel by optimizing the composite subcarrier signal. This optimization is achieved by implementing a controller-based filtering system illustrated in FIG. 6C. At a point of reception, such as illustrated in FIG. 6A, the signals from photodetectors 641a–641e are respectively sent along conduits 681a–681e to summing amplifier 660. In this embodiment of the present invention, the electrical signals are sent to a variable filter 682 that includes a series of variable filters corresponding to the number of photodetectors. As shown in FIG. 6C, variable filter 682 is placed on the input side of summing amplifier 660 to initially filter the electrical signal representatives of the subcarrier signal. A feedback signal is utilized to fine tune variable filter 682. A small portion of composite subcarrier signal 661 is tapped off along conduit 684 and sent to a detector 685. Detector 685 gauges the purity of composite subcarrier signal 661 to maximize the SNR. Detector 685 sends a control signal (not shown) to controller 686. Controller 686 adjusts the individual filters of variable filter 682 to optimize composite subcarrier signal 661. Detector 685, controller 686, and variable filter 682 can each comprise conventional electronic devices well known in the art.

Overall, the present invention offers several advantages to a communications network environment. First, use of a subcarrier modulation signal containing ancillary network data reduces invasiveness into the high-rate signal. Second, the composite subcarrier modulation signal, such as signal 561 from FIG. 5, has a much improved SNR over a single subcarrier modulation signal since the summing amplifier 560 acts to cancel out the low frequency line noise picked up in a modulated optical data signal that has been propagated over a long distance. Third, the presence of a stronger composite subcarrier modulation signal in the subcarrier channel provides for faster error detection. Finally, the composite subcarrier modulation signal provides for a failsafe conduction of subcarrier data: if the signal strength of single subcarrier modulation signal component of an optical carrier is somehow reduced over a long distance fiber link, the summation of the other subcarrier components will still result in an adequate composite subcarrier modulation signal. Thus, the present invention enables all-optical fault detection and subcarrier network communications for wavelength routing, restoration, and quality monitoring in a communication network.

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for managing an optical subcarrier modulation signal in a communication network, wherein the communication network includes first and second sites connected by a fiber link carrying a multi-wavelength modulated optical data signal between the first and second sites, and wherein the multi-wavelength modulated optical data signal includes a first wavelength component and a second wavelength component, comprising the steps of:
   (1) generating a subcarrier modulation signal in a subcarrier channel;
   (2) superimposing the subcarrier modulation signal onto the multi-wavelength modulated optical data signal at the first site to produce a composite signal;
   (3) transmitting the composite signal along the fiber link;
   (4) receiving the composite signal at the second site; and
   (5) communicating the subcarrier modulation signal received at the second site to the subcarrier channel.

2. The method according to claim 1, wherein the first wavelength component of the multi-wavelength modulated optical data signal corresponds to a first carrier signal comprising a first high data rate modulation signal and the second wavelength component of the multi-wavelength modulated optical data signal corresponds to a second carrier signal comprising a second high data rate modulation signal, wherein step (2) comprises the steps of:
   (a) combining the subcarrier modulation signal with the first high data rate modulation signal and with the second high data rate modulation signal; and
   (b) generating the multi-wavelength modulated optical data signal at the first site, wherein the multi-wavelength modulated optical data signal includes the first and second wavelength components and the subcarrier modulation signal, wherein the subcarrier modulation signal comprises ancillary network data, and wherein the subcarrier channel is supported in communication between the first and second sites.

3. The method according to claim 2, wherein step (1) generates a subcarrier modulation signal having a lower frequency and lower amplitude than the first and second high data rate modulation signals.

4. The method according to claim 2, wherein the multi-wavelength modulated optical data signal includes a plurality of wavelength components, wherein the plurality of wavelength components of the multi-wavelength modulated optical data signal correspond to a plurality of high data rate modulation signals, and wherein step (2) comprises the further steps of:
   (c) combining the subcarrier modulation signal with the plurality of high data rate modulation signals; and
   (d) generating the multi-wavelength modulated optical data signal at the first site, wherein the multi-wavelength modulated optical data signal includes the plurality of wavelength components and the subcarrier modulation signal.

5. The method according to claim 4, wherein step (3) comprises the step of:
   multiplexing the plurality of wavelength components to form the multi-wavelength modulated optical data signal.

6. The method according to claim 4, wherein step (4) comprises the steps of:
   (a) de-multiplexing the multi-wavelength modulated optical data signal into the plurality of wavelength components;
   (b) detecting the plurality of wavelength components; and
   (c) generating electrical signals corresponding respectively to the plurality of wavelength components.

7. The method according to claim 4, wherein step (5) further comprises the step of:
   combining subcarrier components of the electrical signals corresponding respectively to the plurality of wavelength components in the summing amplifier.

8. The method according to claim 1, wherein step (3) further comprises the step of:
   (a) multiplexing the first and second wavelength components to form the multi-wavelength modulated optical data signal.

9. The method according to claim 1, wherein step (4) further comprises the steps of:
   (a) de-multiplexing the multi-wavelength modulated optical data signal into the first and second wavelength components;
   (b) detecting the first and second wavelength components; and
   (c) generating electrical signals corresponding to the first and second wavelength components.

10. The method according to claim 9, wherein step (5) comprises the steps of:
    (a) combining subcarrier components of the electrical signals corresponding to the first and second wavelength components in a summing amplifier;
    (b) adding the subcarrier components in the summing amplifier to generate a composite subcarrier modulation signal; and
    (c) sending the composite subcarrier modulation signal to subcarrier network equipment located in the subcarrier channel of the communication network.

11. The method according to claim 10, wherein step (5)(b) further comprises the step of subtracting a noise component from said subcarrier modulation signal in said summing amplifier, thereby increasing signal-to-noise ratio (SNR) of the composite subcarrier modulation signal.

12. The method according to claim 9, further comprising the step of:
    (6) receiving the electrical signals corresponding to the first and second wavelength components at a Line Terminating Equipment (LTE) receiver or a Digital Cross-Connect Switch (DCS) located at the second site.

13. The method according to claim 12, wherein step (5) further comprises the step of:
    regrouping the electrical signals corresponding to the first and second wavelength components in a second summing amplifier to allow subcarrier assignments to other network equipment in the subcarrier channel.

14. A method for generating an optical subcarrier modulation signal in a communication network, wherein the communication network includes first and second sites connected by a fiber link carrying a multi-wavelength modulated optical data signal between the first and second sites, comprising the steps of:
    (1) generating a subcarrier modulation signal in a subcarrier channel, wherein the subcarrier modulation signal comprises ancillary network data, and wherein the subcarrier channel is in communication with the first and second sites;
    (2) combining the subcarrier modulation signal with a first high data rate modulation signal and with a second high data rate modulation signal; and
    (3) generating the multi-wavelength modulated optical data signal at the first site, wherein the multi-wavelength modulated optical data signal includes a first wavelength component, a second wavelength component, and the subcarrier modulation signal, wherein the first wavelength component of the multi-wavelength modulated optical data signal corresponds to a first carrier signal comprising the first high data rate modulation signal and the second wavelength component of the multi-wavelength modulated optical data signal corresponds to a second carrier signal comprising the second high data rate modulation signal.

15. A method for receiving an optical subcarrier modulation signal with an increased signal-to-noise ratio (SNR) in a communication network, wherein the communication network includes first and second sites connected by a fiber link carrying a multi-wavelength modulated optical data signal between the first and second sites, wherein the multi-wavelength modulated optical data signal includes a plurality of wavelength components, comprising the steps of:

(1) de-multiplexing the multi-wavelength modulated optical data signal into the plurality wavelength components, wherein each of the plurality of wavelength components of the multi-wavelength modulated optical data signal further comprises a subcarrier modulation signal;

(2) detecting the plurality of wavelength components;

(3) generating a plurality of electrical signals that correspond respectively to the plurality of wavelength components;

(4) combining subcarrier components of the plurality of electrical signals in a summing amplifier;

(5) adding the subcarrier components in the summing amplifier to generate a composite subcarrier modulation signal; and (6) sending the composite subcarrier modulation signal to subcarrier network equipment located in a subcarrier channel of the communication network.

16. An apparatus for increased signal-to-noise ratio (SNR) optical subcarrier management within a communication network, wherein said network comprises first and second network sites connected by a fiber link carrying a multi-wavelength modulated optical data signal, wherein the multi-wavelength modulated optical data signal includes a first wavelength component and a second wavelength component, comprising:

a subcarrier channel coupled to the first and second network sites of the network to generate and receive a subcarrier modulation signal, a transmitter located at the first network site to transmit the multi-wavelength modulated optical data signal along the fiber link, wherein the multi-wavelength modulated optical data signal includes said subcarrier modulation signal; and a receiver located at the second network site to receive the multi-wavelength modulated optical data signal from the fiber link and to send said subcarrier modulation signal to said subcarrier channel.

17. The apparatus according to claim 16, wherein the first wavelength component of the multi-wavelength modulated optical data signal corresponds to a first high data rate modulation signal and the second wavelength component of the multi-wavelength modulated optical data signal corresponds to a second high data rate modulation signal, wherein said transmitter comprises:

a plurality of optical sources, wherein said plurality of optical sources comprises a first optical source to receive said first high data rate modulation signal and said subcarrier modulation signal, and to generate the corresponding first wavelength component of the multi-wavelength modulated optical data signal, a second optical source to receive said second high data rate modulation signal and said subcarrier modulation signal, and to generate the corresponding second wavelength component of the multi-wavelength modulated optical data signal; and a multiplexer for combining the first and second wavelength components into the multi-wavelength modulated optical data signal that travels along the fiber link.

18. The apparatus according to claim 17, wherein said first and second high data rate modulation signals are each SONET compliant signals and wherein said subcarrier modulation signal is of a lower frequency and lower amplitude than said first and second high data rate modulation signals, and wherein said subcarrier modulation signal contains ancillary network data.

19. The apparatus according to claim 17, wherein the multi-wavelength modulated optical data signal includes a plurality of wavelength components, wherein said plurality of wavelength components of the multi-wavelength modulated optical data signal correspond to a plurality of high data rate modulation signals, wherein said plurality of optical sources receive respectively said plurality of high data rate modulation signals and said subcarrier modulation signal, and generate respectively said plurality of wavelength components of the multi-wavelength modulated optical data signal, and wherein said multiplexer combines said plurality of wavelength components into the multi-wavelength modulated optical data signal.

20. The apparatus according to claim 19, wherein said receiver comprises:

a de-multiplexer coupled to the fiber link at the second site for separating said plurality of wavelength components of the multi-wavelength modulated optical data signal;

a plurality of photodetectors, coupled to said output of said de-multiplexer at the second site, for respectively detecting said plurality of wavelength components of the multi-wavelength modulated optical data signal and for respectively generating electrical signals corresponding to said plurality of wavelength components of the multi-wavelength modulated optical data signal, and wherein outputs of said plurality of photodetectors are coupled to said subcarrier channel.

21. The apparatus according to claim 20, wherein a summing amplifier is coupled to said outputs of said plurality of photodetectors, and combines said subcarrier modulation signal superimposed onto said plurality of wavelength components of the multi-wavelength modulated optical data signal and generates said composite subcarrier modulation signal.

22. The apparatus according to claim 20, wherein said outputs of said plurality of photodetectors are respectively further coupled to a plurality of channel outputs, wherein said plurality of channel outputs respectively deliver said electrical signals corresponding to said plurality of wavelength components of the multi-wavelength modulated optical data signal to network signal demodulating equipment located at the second site.

23. The apparatus according to claim 20, wherein said outputs of said plurality of photodetectors are respectively further coupled to a plurality of channel outputs, wherein said plurality of channel outputs respectively deliver said electrical signals to a network Digital Cross-Connect Switch (DCS) located at the second site.

24. The apparatus according to claim 16, wherein said subcarrier channel comprises:
- a subcarrier modulation signal generator coupled to the first site for generating said subcarrier modulation signal that is sent to said transmitter;
- a summing amplifier, coupled to said receiver at the second site, to combine said subcarrier modulation signal from the multi-wavelength modulated optical data signal received at said receiver, and to generate a composite subcarrier modulation signal having an increased SNR corresponding to said subcarrier modulation signal generated by said subcarrier modulation signal generator; and
- a subcarrier receiver, coupled to said summing amplifier, to receive said composite subcarrier modulation signal.

25. The apparatus according to claim 24, wherein the subcarrier channel further comprises:
- a second summing amplifier, coupled to the receiver at the second site, to allow further subcarrier modulation signal assignments to other network equipment located in said subcarrier channel.

26. The apparatus according to claim 24, wherein the subcarrier channel further comprises:
- a variable filter, coupled to said receiver at the second site, to filter said subcarrier modulation signal;
- a detector to detect a portion of said composite subcarrier signal; and
- a controller, coupled to said detector, to alter said variable filter corresponding to said signal detected at said detector.

27. The apparatus according to claim 16, wherein said first site further comprises:
- a modulator, coupled to said subcarrier modulation signal generator and said transmitter, which superimposes said subcarrier modulation signal on the first and second wavelength components of said multi-wavelength modulated optical data signal.

28. The apparatus according to claim 27, further comprising:
- a network management system, coupled to the first and second sites and to said subcarrier channel, for monitoring a status of said composite subcarrier modulation signal.

29. A system for managing an optical subcarrier in an optical communication network, comprising:
- a subcarrier generator, coupled to a first site, to generate a subcarrier modulation signal containing ancillary network data;
- a modulator, located at said first site, which superimposes said subcarrier modulation signal on a first optical carrier data signal having a first wavelength and on a second optical carrier data signal having a second wavelength, wherein said first optical carrier data signal corresponds to a first high data rate modulation signal and said second optical carrier data signal corresponds to a second optical data carder signal,
- a multiplexer, located at said first site, to combine said first optical carrier data signal and said second optical carrier data signal into a multi-wavelength modulated optical data signal;
- at least one fiber link connecting said first site to a second site, for transporting said multi-wavelength modulated optical data signal with said subcarrier modulation signal through said optical communication network;
- a receiver, located at said second site and coupled to said at least one fiber link, which de-multiplexes multi-wavelength modulated optical data signal and recovers said subcarrier modulation signal from said first and second optical data carrier signals;
- a summing amplifier, coupled to said receiver at said second site, to combine said subcarrier modulation signal from said multi-wavelength modulated optical data signal received at said receiver, and to generate a composite subcarrier modulation signal having an increased SNR corresponding to said subcarrier modulation signal generated by said subcarrier modulation signal generator;
- a subcarrier receiver, coupled to said summing amplifier, to receive said composite subcarrier modulation signal;
- a demultiplexer, located at said second site, to separate said first optical carrier data signal and said second optical carrier data signal;
- a photodetector coupled to said demultiplexer for recovering the subcarrier modulation signal; and
- a network management system, wherein said network management system manages said optical communication network based on said recovered ancillary network data output.

* * * * *